(12) United States Patent
Karri et al.

(10) Patent No.: US 9,491,269 B2
(45) Date of Patent: Nov. 8, 2016

(54) UPLINK TRANSMISSION RATE IN A WIRELESS COMMUNICATION DEVICE

(71) Applicant: Apple Inc., Cupertino, CA (US)

(72) Inventors: Sai Sravan Bharadwaj Karri, Santa Clara, CA (US); Naveen Rawat, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 257 days.

(21) Appl. No.: 14/251,445

(22) Filed: Apr. 11, 2014

(65) Prior Publication Data

US 2015/0296059 A1 Oct. 15, 2015

(51) Int. Cl.
| | | |
|---|---|---|
| H04L 1/18 | (2006.01) | |
| H04L 12/58 | (2006.01) | |
| H04L 29/08 | (2006.01) | |
| H04W 80/02 | (2009.01) | |

(52) U.S. Cl.
CPC .......... *H04L 69/324* (2013.01); *H04L 1/1812* (2013.01); *H04L 1/1896* (2013.01); *H04W 80/02* (2013.01)

(58) Field of Classification Search
None
See application file for complete search history.

(56) References Cited

U.S. PATENT DOCUMENTS

| | | | |
|---|---|---|---|
| 8,175,014 B2 | 5/2012 | Terry et al. | |
| 8,830,944 B1* | 9/2014 | Quan | H04W 28/06 370/329 |
| 2009/0104890 A1* | 4/2009 | Wang | H04W 12/02 455/410 |
| 2011/0310856 A1 | 12/2011 | Hariharan et al. | |
| 2013/0215772 A1* | 8/2013 | Kaur | H04W 36/0072 370/252 |
| 2013/0294362 A1 | 11/2013 | Xu et al. | |
| 2014/0023004 A1 | 1/2014 | Kumar et al. | |
| 2014/0031031 A1 | 1/2014 | Gauvreau et al. | |
| 2014/0036806 A1 | 2/2014 | Chen et al. | |
| 2014/0198643 A1* | 7/2014 | Conway | H04W 24/08 370/230 |
| 2014/0286258 A1* | 9/2014 | Chowdhury | H04L 1/1812 370/329 |
| 2014/0307567 A1* | 10/2014 | Li | H04L 1/1812 370/252 |
| 2015/0049732 A1* | 2/2015 | Xue | H04L 1/1854 370/330 |
| 2015/0146614 A1* | 5/2015 | Yu | H04L 5/0032 370/328 |
| 2015/0208282 A1* | 7/2015 | Grant | H04W 36/0005 370/331 |
| 2015/0229370 A1* | 8/2015 | Lidian | H04L 1/1861 370/335 |
| 2015/0288594 A1* | 10/2015 | Yin | H04W 24/04 370/252 |
| 2016/0050054 A1* | 2/2016 | Wager | H04L 5/0035 455/450 |

\* cited by examiner

*Primary Examiner* — Brandon Renner (57) ABSTRACT

A method for improving uplink transmission rate in a wireless communication device is provided. The wireless communication device can include a first logical layer and a second logical layer. The method can include the wireless communication device decoding, at the first logical layer, a first acknowledgement status of a transmitted data unit. The method can further include the wireless communication device determining, at the first logical layer, a second acknowledgement status of the data unit, which can be an acknowledgement status of the data unit at the second logical layer. The method can additionally include the wireless communication device determining, at the first logical layer, whether to retransmit the data unit based at least in part on both the first acknowledgement status of the data unit and the second acknowledgement status of the data unit.

20 Claims, 8 Drawing Sheets

UPLINK TRANSMISSION RATE IN A WIRELESS COMMUNICATION DEVICE

FIELD

The described embodiments relate generally to wireless communications technology. More particularly, the present embodiments relate to improving uplink transmission rate in a wireless communication device.

BACKGROUND

Data transmissions in a wireless communication system are susceptible to interference and other conditions that can impact radio links, which can result in a data unit being received in error, or even not received at all by a receiver. As such, nodes in a wireless communication system generally implement one or more mechanisms to support retransmission and error correction in the event that a data unit is dropped on the radio link or received in error. For example, some wireless communication systems, such as Long Term Evolution (LTE) systems, implement a mechanism known as hybrid automatic repeat request (HARQ) that can respond to errors by performing retransmission of data at a physical (PHY) layer in response to a retransmission request by the receiving node.

In LTE systems, an evolved node B (eNB) can send an acknowledgement status—e.g., an acknowledgement (ACK) or a negative-acknowledgement (NACK)—for a data unit sent by a wireless communication device served by the eNB on a physical HARQ indicator channel (PHICH). The acknowledgement status sent on the PHICH can be used by the media access control (MAC) layer of the wireless communication device to determine whether to perform a HARQ retransmission. In this regard, if the eNB does not successfully receive the data unit and sends a NACK, the wireless communication device can perform a HARQ retransmission to retransmit the data unit to the eNB. However, the PHICH is susceptible to interference such that HARQ ACKs/NACKs can often be corrupted in transmission and/or otherwise misinterpreted by the wireless communication device. In this regard, if multiple devices use the same frequency and orthogonal code and one transmits data while the other is receiving a HARQ ACK/NACK on the PHICH, the resulting interference can result in the HARQ ACK/NACK being misinterpreted by the device receiving the HARQ ACK/NACK. Accordingly, in some cases, a wireless communication device can needlessly perform a HARQ retransmission where HARQ retransmission was not requested by the eNB, thus slowing down the uplink transmission rate. Alternatively, if a wireless communication device misinterprets a HARQ NACK as an ACK, the device can continue on with transmission of the next data unit, which can result in the previous data unit being dropped at the eNB, thus negatively impacting performance. In this regard, HARQ is not designed to provide 100% transmission accuracy, but rather is designed to provide for fast retransmission to support high throughput applications while satisfying a target error rate, such as a maximum block error rate (BLER) of 10%.

Accordingly, while HARQ is designed to provide for fast retransmission and error correction at the physical layer in fast fading conditions, HARQ is not designed to be fully robust for applications requiring a low error rate. Further, HARQ implementations do not provide for reordering of out of order data packets at the MAC layer. For this purpose, a second retransmission mechanism known as automatic repeat request (ARQ) can be implemented at the radio link control (RLC) layer in LTE systems. Acknowledgement statuses used for ARQ in the RLC layer can be sent to a wireless communication device by an eNB on the physical downlink shared channel (PDSCH), which is less susceptible to interference than the PHICH. Accordingly, the ARQ mechanism implemented by the RLC layer can be more robust to interference and provide a higher level of accuracy than that provided by HARQ at the physical layer. However, ARQ is a slower mechanism that does not result in correction of errors as quickly as HARQ, and retransmission via ARQ processes can reduce throughput more than HARQ retransmission processes.

Moreover, there is no coordination between the MAC layer and RLC layer when performing HARQ and/or ARQ processes. In this regard, the acknowledgement status and ARQ process used at the RLC layer is completely siloed and separate from the acknowledgement status and HARQ process at the MAC layer such that the MAC layer does not have access to or consider any feedback from the RLC layer when determining whether to perform a HARQ retransmission.

SUMMARY

Some example embodiments improve uplink transmission rate in a wireless communication device by addressing the above-described deficiencies in existing retransmission and reordering techniques. In particular, a wireless communication device in accordance with some example embodiments can be configured to reduce the incidence of errors in lower layer retransmission mechanisms, such as HARQ, by factoring in an acknowledgement status for a higher layer retransmission mechanism, such as ARQ at the RLC layer, which can be more robust to interference than the lower layer acknowledgement status, when determining whether to retransmit a data unit at the lower layer. As such, erroneous HARQ retransmissions that can unnecessarily reduce uplink throughput if an ACK on the PHICH is misinterpreted as a NACK can be avoided by considering the acknowledgement status of the data unit at the RLC layer, which can be less susceptible to interference. Similarly, the incidence of dropped packets that can result from misinterpreting a PHICH NACK as an ACK can be reduced by considering the acknowledgement status of the data unit at the RLC layer.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Some example embodiments disclosed herein improve uplink transmission rate in a wireless communication device. For example, a wireless communication device in accordance with some example embodiments can be configured to reduce the incidence of errors in a retransmission mechanism at a first logical layer by factoring in an acknowledgement status for a retransmission mechanism implemented at a second logical layer which can be more robust to interference than the first logical layer acknowledgement status, when determining whether to retransmit a data unit at the lower layer. For example, in some embodiments, the acknowledgement status of a data unit at the RLC layer can be considered at the MAC layer when determining whether to perform a HARQ retransmission.

As the acknowledgement status at the second logical layer can be more robust to interference than the acknowledgement status at the first logical layer, consideration of the acknowledgement status of the data unit at the second logical layer can reduce the incidence of retransmission errors based on erroneously received acknowledgement statuses at the first logical layer and improve the uplink throughput. Thus, for example, erroneous HARQ retransmissions that can unnecessarily reduce uplink throughput if an ACK on the PHICH is misinterpreted as a NACK can be avoided by considering the acknowledgement status of the data unit at the RLC layer, which can be less susceptible to interference. Similarly, the incidence of dropped packets and/or retransmission delays at higher layer that can result from misinterpreting a PHICH NACK as an ACK can be reduced by considering the acknowledgement status of the data unit at the RLC layer. By recognizing a misinterpreted PHICH NACK at the MAC layer based on the acknowledgement status at the RLC layer, unsuccessfully transmitted data units can be recognized earlier and more often, thus providing for earlier retransmission at the MAC layer via HARQ processes and leaving fewer data units for correction and reordering at the RLC layer and improving overall uplink throughput.

Accordingly, some example embodiments introduce cross-layer coordination between a first logical layer (e.g., the MAC layer) and a second logical layer (e.g., the RLC layer) to improve the accuracy of a retransmission mechanism of the first logical layer by factoring in acknowledgement status feedback from the second logical layer when making a retransmission decision. The fast retransmission advantages that can be offered by HARQ and/or other retransmission mechanism that can be implemented at a first logical layer can therefore be leveraged while also gaining the benefit of the robustness and higher level of accuracy of the acknowledgement status for ARQ and/or other retransmission mechanism that can be implemented at a second logical layer, thereby providing improved uplink throughput.

These and other embodiments are discussed below with reference to FIGS. 1-8. However, those skilled in the art will readily appreciate that the detailed description given herein with respect to these Figures is for explanatory purposes only and should not be construed as limiting.

Figure 1:
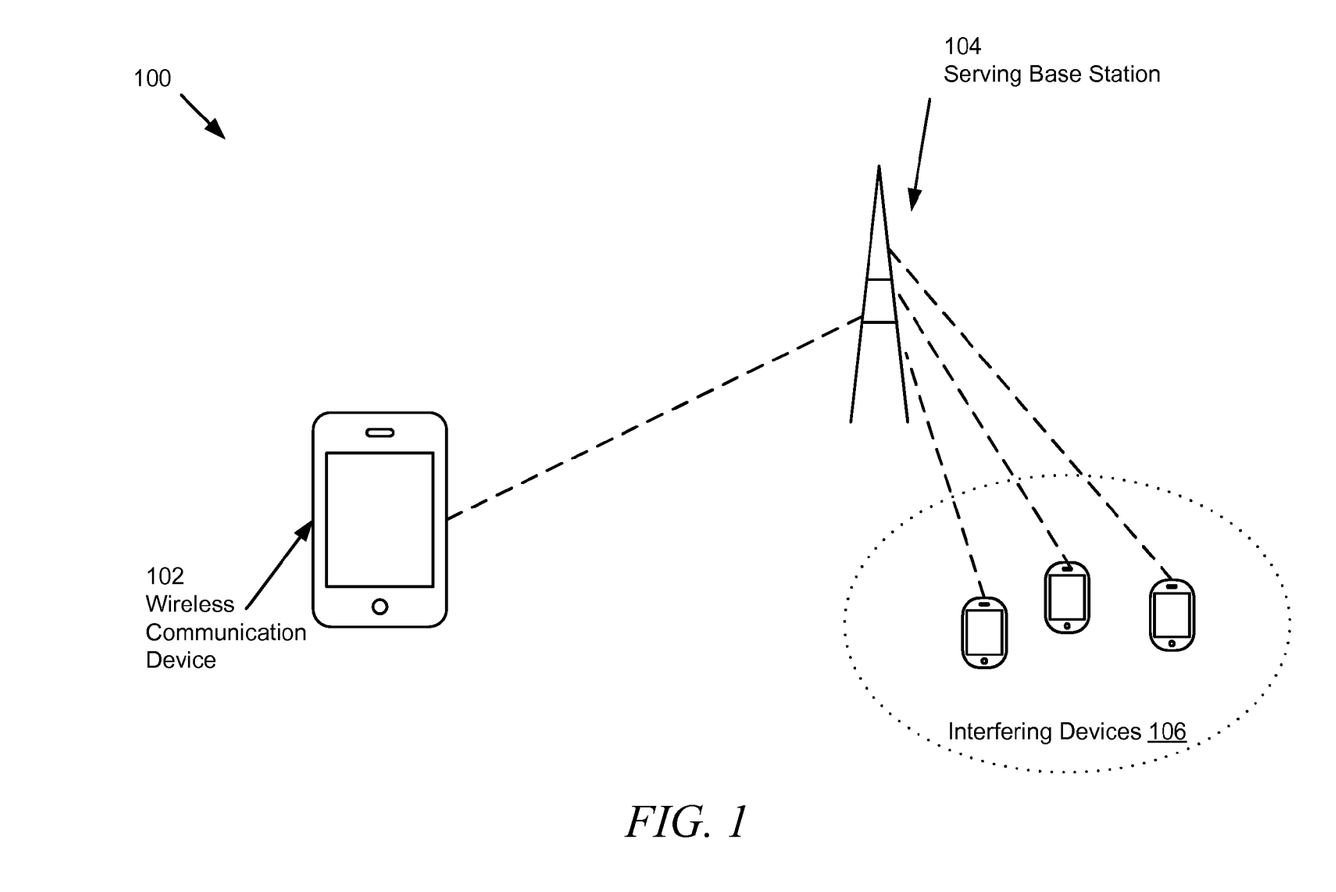
FIG. 1 illustrates an example wireless communication system in which some example embodiments can be implemented.

FIG. 1 illustrates an example wireless communication system 100 in which some example embodiments can be implemented. The system 100 can include a wireless communication device 102, which can, for example, comprise a cellular phone, such as a smart phone device, a tablet computing device, a laptop computer, a digital media player, a gaming device, a mobile Wi-Fi hotspot (e.g., a MiFi device®), some combination thereof, or other computing device that can be configured to communicate over a cellular and/or other wireless network.

The wireless communication device 102 can be camped on serving base station 104 of a serving cellular network. The serving base station 104 can be any type of cellular base station dependent on a type of radio access technology (RAT) used by the serving cellular network. By way of non-limiting example, the serving base station 104 can be a base station (BS), base transceiver station (BTS), node B, evolved Node B (eNB), some combination thereof, and/or other type of cellular base station.

The serving cellular network can use any RAT that can be supported by both the wireless communication device 102. In some example embodiments, the wireless communication device 102 can be a multi-mode device capable of supporting multiple cellular RATs. By way of non-limiting example, the system 100 can use a Long Term Evolution (LTE) RAT, such as various releases of the LTE standard specified by the Third Generation Partnership Project (3GPP), including various releases of LTE, LTE-Advanced (LTE-A), and/or other present or future releases using LTE technology. As another example, the system 100 can implement a third generation (3G) cellular RAT, such as Wideband Code Division Multiple Access (WCDMA) or other Universal Mobile Telecommunications System (UMTS) RAT, such as Time Division Synchronous Code Division Multiple Access (TD-SCDMA); CDMA2000; 1×RTT; and/or the like. As another example, the system 100 can implement a second generation (2G) cellular RAT, such as a Global System for Mobile Communications (GSM) RAT. As a further example, the system 100 of some embodiments can implement a radio access network implementing a Worldwide Interoperability for Microwave Access (WiMAX) RAT. It will be appreciated that the foregoing RATs are provided by way of example, and not by way of limitation. In this regard, the system 100 can implement any present or future developed RAT, including, for example, various fifth generation (5G) RATs now in development. Further, while the system 100 is illustrated and described as including cellular access network, it will be appreciated that techniques described herein can be applied mutatis mutandis to improve transmission rate in any wireless communication technology in which transmitted data units can be ACKed/NACKed by a receiving device and a transmitting device can implement a retransmission mechanism.

The wireless communication device 102 can send data on an uplink to the serving base station 104. As further illustrated and described below with respect to FIGS. 3 and 4, acknowledgement and retransmission mechanisms can be implemented via multiple end-to-end logical layers in protocol stacks that can be implemented on the wireless communication device 102 and serving base station 104. The serving base station 104 can accordingly signal multiple acknowledgement statuses for data units transmitted by the wireless communication device 102. For example, in some embodiments, such as some embodiments in which the serving base station 104 is a base station for an LTE network, a first acknowledgement status can be sent on a PHICH, which can provide HARQ feedback for a HARQ process that can be implemented by the wireless communication device 102 (e.g., at the MAC layer) of some example embodiments. A second acknowledgement status can be sent on a physical downlink shared channel (PDSCH), which can provide feedback for an ARQ process that can be implemented by the wireless communication device 102 (e.g., at the RLC layer) of some example embodiments.

An acknowledgement status that can be transmitted by the serving base station 104 for a retransmission mechanism that can be implemented by the wireless communication device 102 at a first logical layer, such as the MAC layer can be more susceptible to interference than an acknowledgement status that can be transmitted by the serving base station 104 for a retransmission mechanism that can be implemented by the wireless communication device 102 at a first logical layer, such as the RLC layer. In this regard, the system 100 can further include one or more interfering devices 106. Transmissions to and/or from interfering devices 106 can interfere with the transmission of an acknowledgement status to the wireless communication device 102 by the serving base station 104. For example, in some instances, one or more interfering devices 106 can be camped on the serving base station 104 using the same frequency as used by the wireless communication device 102. There can be a limited pool of orthogonal codes that can be assigned to wireless communication devices served by the serving base station 104, which are using the same frequency in order to facilitate sharing radio resources. For example, in LTE systems, there can be a pool of four (4) orthogonal codes. As such, a given orthogonal code is often used by multiple devices, including multiple devices using the same frequency. Accordingly, one or more interfering devices 106 can use the same frequency and orthogonal code as the wireless communication device 102.

If an interfering device 106 that is assigned the same frequency and orthogonal code as the wireless communication device 102 transmits in the same time slot as the wireless communication device 102 is receiving an acknowledgement status on a channel susceptible to interference, such as in the case of HARQ feedback transmitted on PHICH, the acknowledgement status can be misinterpreted by the wireless communication device 102. As described further herein, the wireless communication device 102 of some example embodiments can implement cross-layer coordination such that an acknowledgement status from a higher logical layer (e.g., an acknowledgement status that can be transmitted on PDSCH for the RLC layer) that is less susceptible to interference can be considered when making retransmission decisions at the lower logical layer (e.g., the MAC layer) in order to mitigate the effect of interference on the lower layer acknowledgement status and improve uplink throughput.

Figure 2:
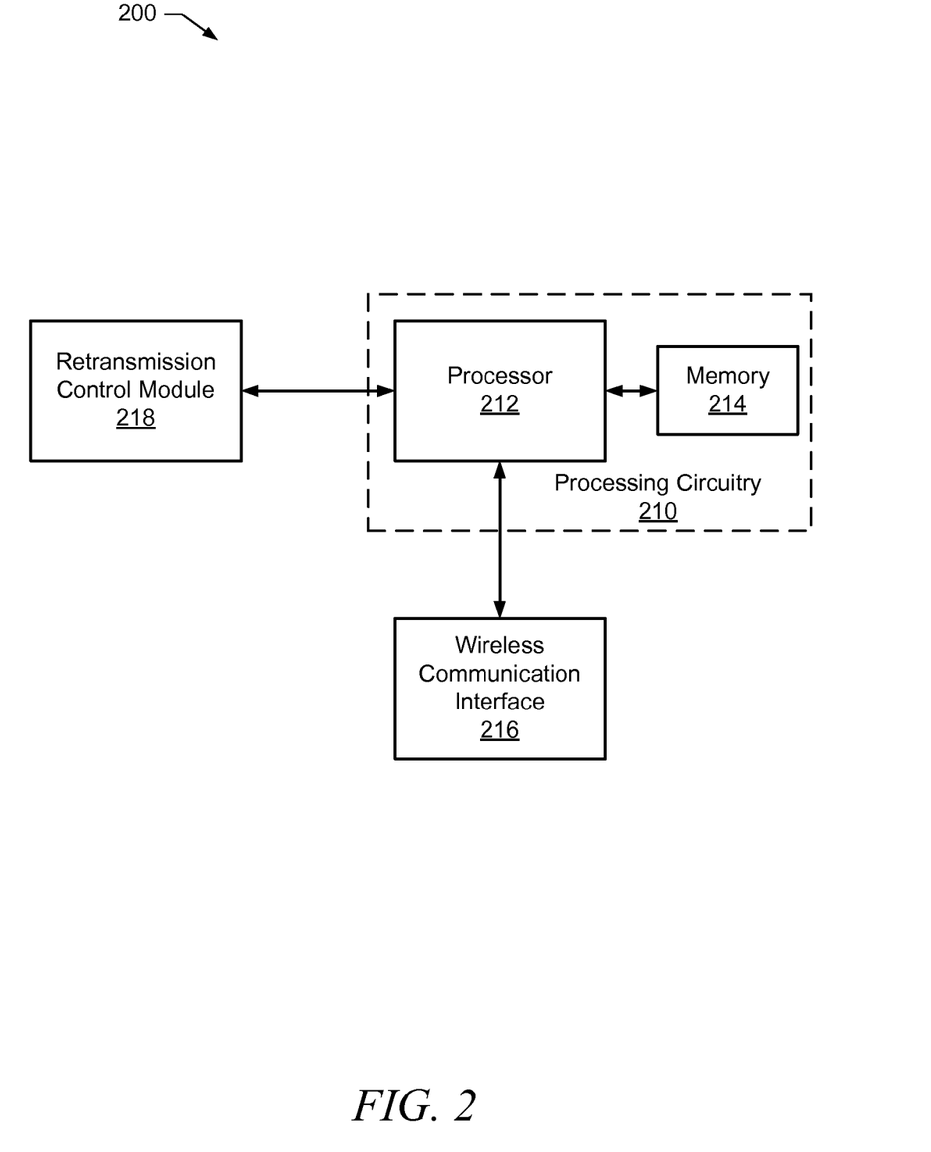
FIG. 2 illustrates a block diagram of an apparatus that can be implemented on a wireless communication device in accordance with some example embodiments.

FIG. 2 illustrates a block diagram of an apparatus 200 that can be implemented on a wireless communication device, such as wireless communication device 102, in accordance with some example embodiments. In this regard, when implemented on a computing device, such as wireless communication device 102, apparatus 200 can enable the computing device to operate within the wireless communication system 100 and to make retransmission decisions in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the wireless communication device 102, in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a chipset. In some example embodiments in which one or more components of the apparatus 200 are embodied as a chipset, the chipset can be capable of enabling a computing device to operate within a wireless communication system, such as the system 100, when implemented on or otherwise operably coupled to the computing device. In some example embodiments, the apparatus 200 can include a cellular baseband chipset, which can be configured to enable communication between a computing device, such as wireless communication device 102, and a cellular network via serving base station 104.

In some example embodiments, the processing circuitry 210 can include a processor 212 and, in some embodiments, such as that illustrated in FIG. 2, can further include memory 214. The processing circuitry 210 can be in communication with or otherwise control the wireless communication interface 216 and/or retransmission control module 218.

The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the apparatus 200 as described herein. In some example embodiments, the processor 212 can be configured to execute instructions that can be stored in the memory 214 or that can be otherwise accessible to the processor 212. As such, whether configured by hardware or by a combination of hardware and software, the processor 212 capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments in which the apparatus 200 comprises a cellular baseband chipset, the memory 214 can comprise memory implemented on the cellular baseband chipset. In some embodiments, the memory 214 can be in communication with one or more of the processor 212, wireless communication interface 216, or retransmission control module 218 via a bus(es) for passing information among components of the apparatus 200.

The apparatus 200 can further include a wireless communication interface 216. The wireless communication interface 216 can enable the apparatus 200 to send wireless signals to and receive signals from one or more wireless networks. Thus, for example, when implemented on wireless communication device 102, the wireless communication interface 216 can be configured to support a connection to a base station, such as serving base station 104, via any cellular RAT that can be implemented by the base station. The wireless communication interface 216 can additionally include one or more transceivers and/or other radio components to support one or more further wireless communication technologies that can be implemented on a wireless communication device 102. For example, the wireless communication interface 216 can include radio components for supporting communication via Wi-Fi, Bluetooth, and/or other wireless communication technology.

The apparatus 200 can further include the retransmission control module 218. The retransmission control module 218 can be embodied as various means, such as circuitry, hardware, a computer program product comprising a computer readable medium (for example, the memory 214) storing computer readable program instructions that are executable by a processing device (for example, the processor 212), or some combination thereof. In some embodiments, the processor 212 (or the processing circuitry 210) can include, or otherwise control the retransmission control module 218. The retransmission control module 218 can be configured to determine whether to retransmit a data unit in accordance with various example embodiments disclosed herein.

A protocol stack comprising a plurality of logical layers can be implemented on the wireless communication device 102. In some example embodiments, the protocol stack can conform with the Open Systems Interconnection (OSI) model. The protocol stack can at least include a first logical layer and a second logical layer. It will be appreciated, however, that the unless otherwise noted, the use of the terms "first logical layer" and "second logical layer" to refer to respective logical layers that can be implemented on the wireless communication device 102 does not denote the logical layer's position within the OSI model, but rather is used to generally distinguish between and refer to the functionality and interaction between any two respective logical layers which may be used to implement functionality in accordance with an example embodiment. For example, the first logical layer of some example embodiments can be the MAC layer, which may be implemented as a sublayer of the data link layer, or layer 2 (L2), in the OSI model. Similarly, the second logical layer of some example embodiments may be the RLC layer, which may likewise be implemented as a sublayer of the data link layer in the OSI model.

The retransmission control module 218 can be at least partially implemented on and/or otherwise control at least some functionality of the first logical layer. The first logical layer can control a retransmission mechanism, such as, by way of non-limiting example, HARQ. In order to support the retransmission mechanism, the first logical layer can interact with a lower layer, such as a physical (PHY) layer, or layer 1 (L1), in the OSI model, which can be responsible for performing retransmissions under the control of the first logical layer, to support the retransmission mechanism. The first logical layer can also be configured to decode an acknowledgement status for a transmitted data unit, which can be transmitted under the control of a corresponding logical layer of the serving base station 104, and which can be used to determine whether to retransmit a previously transmitted data unit. For example, in some embodiments, such as some embodiments in which the system 100 comprises an LTE network, the acknowledgement status for the first logical layer retransmission mechanism can comprise HARQ feedback transmitted to the wireless communication device 102 on a PHICH. In some embodiments, such as some embodiments in which the first logical layer comprises a MAC layer, the first logical layer can additionally be configured to implement medium access and scheduling control functionality.

The second logical layer can be a higher layer on the protocol stack than the first logical layer. The second logical layer can implement a second retransmission mechanism, which can be independent of that which can be implemented by the first logical layer. In this regard, the retransmission mechanism of the second logical layer can be used to correct any residual errors that may not be corrected by the retransmission mechanism of the first logical layer. For example, in some embodiments, such as some embodiments in which the second logical layer is an RLC layer, the second logical layer can implement an ARQ mechanism. In order to support the retransmission mechanism, the second logical layer can receive an acknowledgement status, which can be distinct of that which can be decoded by the first logical layer. For example, in some embodiments, such as some embodiments in which the system 100 comprises an LTE network, the acknowledgement status for the second logical layer retransmission mechanism can be transmitted to the wireless communication device 102 under the control of a corresponding layer of the serving base station 104 on a PDSCH.

In some embodiments, the second logical layer can be an RLC layer which can be configured to operate in RLC acknowledged mode (AM), which can be selectively activated to provide higher accuracy for applications and services that are more sensitive to error rate. The second logical layer can additionally be configured to perform data segmentation and concatenation functionalities. For example, the second logical layer can receive service data units (SDUs) from a higher layer, such as a packet data convergence protocol (PDCP) layer, and can segment received SDUs into packet data units (PDUs) (e.g., RLC PDUs). The second logical layer can additionally add a header (e.g., an RLC header) to the PDUs, and can pass the PDUs to the first logical layer, which can schedule transmission over the uplink to the serving base station 104.

The retransmission control module 218 can be configured to determine the acknowledgement status for a transmitted data unit at the second logical layer. As described further herein below, some example embodiments implement cross-layer coordination such that the retransmission control module 218 can be configured to poll and/or otherwise request the second logical layer to provide an indication of the acknowledgement status for the data unit to the first logical layer. When making a retransmission decision for the retransmission mechanism implemented at the first logical layer, the retransmission control module 218 can be configured to consider the acknowledgement status at the second logical layer in addition to or in lieu of the acknowledgement status that can be decoded at the first logical layer. For example, in some embodiments, the retransmission control module 218 can use the acknowledgement status at the second logical layer to confirm whether the acknowledgement status at the first logical layer first was properly received and decoded.

In some example embodiments, the retransmission control module 218 can be configured to follow the acknowledgement status at the second logical layer, such that if the acknowledgement status at the second logical layer is different than the acknowledgement status decoded at the first logical layer, the retransmission control module 218 can be configured to make a retransmission decision in accordance with the acknowledgement status at the second logical layer. Thus, for example, if a NACK is decoded at the first logical layer, but the acknowledgement status at the second logical layer is an ACK, the retransmission control module 218 can be configured to determine not to perform retransmission of the data unit via the retransmission mechanism implemented at the first logical layer. If, however, the acknowledgement status at the second logical layer is also a NACK, the retransmission control module 218 can determine to perform retransmission of the data unit via the retransmission mechanism implemented at the first logical layer. As a further example, if an ACK is decoded at the first logical layer, but the acknowledgement status at the second logical layer is a NACK, the retransmission control module 218 can be configured to determine to perform retransmission of the data unit via the retransmission mechanism implemented at the first logical layer. If, however, the acknowledgement status at the second logical layer is also an ACK, the retransmission control module 218 can determine not to perform retransmission of the data unit via the retransmission mechanism implemented at the first logical layer.

In some embodiments, the retransmission control module 218 can be configured to determine and consider the acknowledgement status of a data unit at the second logical layer when making a retransmission decision regardless of the acknowledgement status decoded at first logical layer. However, in some embodiments, the retransmission control module 218 can be configured to determine and consider the acknowledgement status at the second logical layer only if a NACK is decoded at the first logical layer. Alternatively, in some embodiments, the retransmission control module 218 can be configured to determine and consider the acknowledgement status at the second logical layer only if an ACK is decoded at first logical layer.

Figure 3:
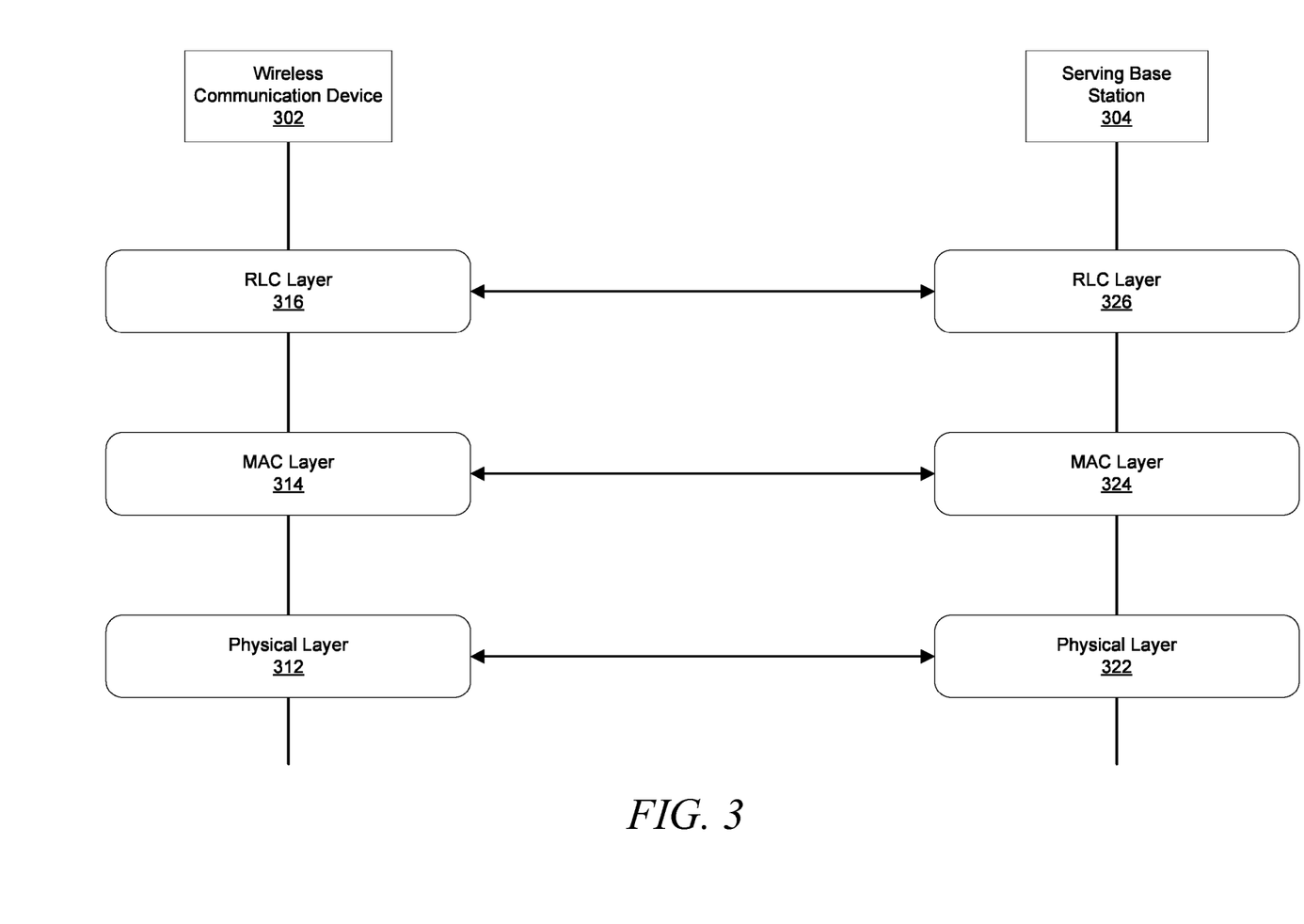
FIG. 3 illustrates end-to-end interaction between layers of protocol stacks that can be implemented on a wireless communication device and a serving base station in accordance with some example embodiments.

FIG. 3 illustrates end-to-end interaction between layers of protocol stacks that can be implemented on a wireless communication device 302 and a serving base station 304 in accordance with some example embodiments. For example, the protocol stacks illustrated in FIG. 3 can correspond to a portion of an LTE protocol stack that can be implemented on a wireless communication device and an eNB within an LTE network. The wireless communication device 302 can, for example, comprise an embodiment of the wireless communication device 102. The serving base station 304 can, for example, comprise an embodiment of the serving base station 104. The wireless communication device 302 and serving base station 304 can each implement a protocol stack comprising a physical layer (i.e., the physical layer 312 on the wireless communication device 302 and the physical layer 322 on the serving base station 304), a MAC layer (i.e., the MAC layer 314 on the wireless communication device 302 and the MAC layer 324 on the serving base station 304), and an RLC layer (i.e., the RLC layer 316 on the wireless communication device 302 and the RLC layer 326 on the serving base station 304).

It will be appreciated that the example of FIG. 3 is provided by way of example, and not by way of limitation, such that other respective logical layers can be substituted for the MAC layers 314 and 324 and/or RLC layers 316 and 326 within the scope of the disclosure. It will be further appreciated that one or more of the wireless communication device 302 or the serving base station 304 can implement additional logical layers beyond those illustrated in FIG. 3.

Data units can be transmitted on an uplink from the wireless communication device 302 to the serving base station 304 via the physical layer 312, and can be received via the physical layer 322 of the serving base station 304. The MAC layer 314 and MAC layer 324 can be configured to support a HARQ process for retransmission of data units that are not properly received by the serving base station 304. The HARQ process can be implemented at the physical layer 312 under control of the MAC layer 314. The MAC layer 324 of the serving base station 304 can be configured to provide an acknowledgement status for a data unit transmitted by the wireless communication device 302 (e.g., HARQ feedback) that can be used by the MAC layer 314 to determine whether to perform a HARQ retransmission. This MAC layer acknowledgement status can be transmitted to the wireless communication device 302 on a PHICH, and can be decoded by the MAC layer 314.

The RLC layer 316 and RLC layer 326 can be configured to implement an additional retransmission mechanism, such as ARQ, which can be configured to perform packet reordering and address any residual errors that may not have been corrected through HARQ at the MAC layer. The RLC layer 326 can be configured to send an acknowledgement status for the RLC layer to the wireless communication device 302, which can be used by the RLC layer 316 to determine whether to perform a retransmission (e.g., an ARQ retransmission). The RLC layer acknowledgement status can be transmitted to the wireless communication device 302 on a PDSCH, and can be more robust to interference than the HARQ feedback that can be decoded at the MAC layer 314.

In accordance with some example embodiments, the MAC layer 314 (e.g., a retransmission control module 218 that can be implemented on and/or otherwise control at least some functionality of the MAC layer 314) can determine the acknowledgement status of a data unit at the RLC layer, and can consider that acknowledgement status when determining whether to perform a HARQ retransmission of the data unit.

Figure 4:
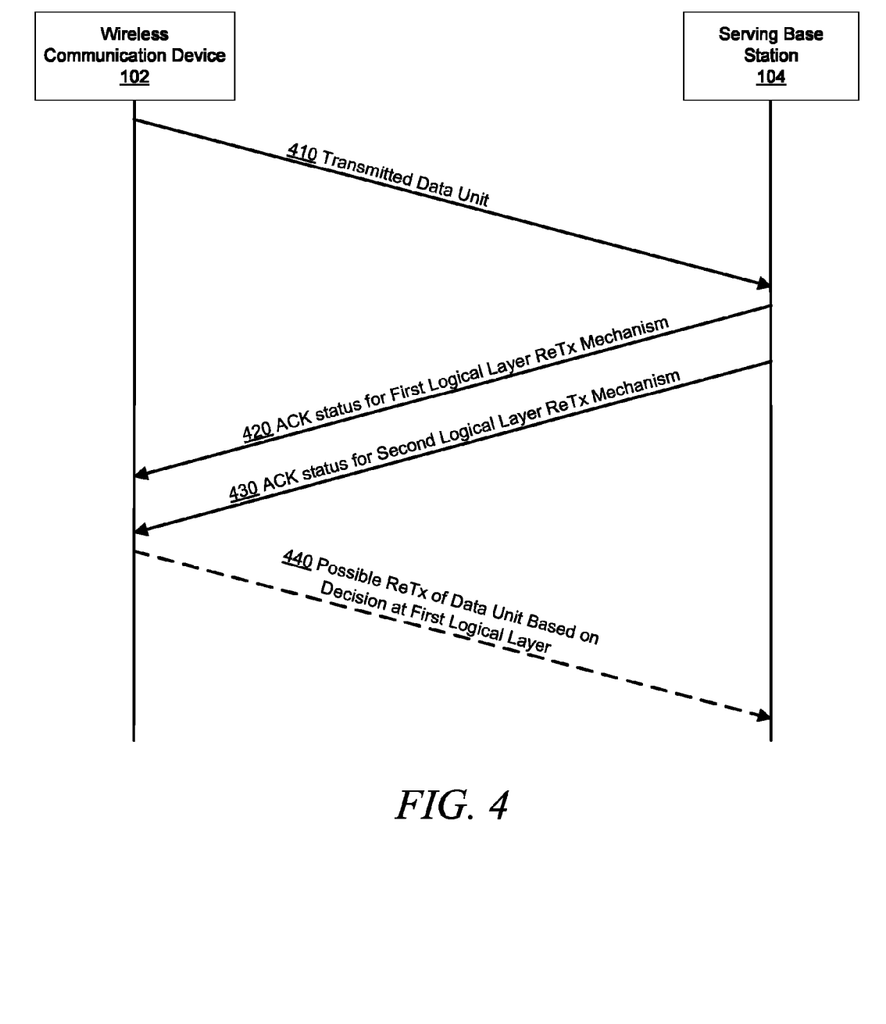
FIG. 4 is an example timing diagram illustrating the use of acknowledgement statuses from multiple layers for making a retransmission decision in accordance with some example embodiments.

FIG. 4 is an example timing diagram illustrating the use of acknowledgement statuses from multiple layers for making a retransmission decision in accordance with some example embodiments. As illustrated in FIG. 4, the wireless communication device 102 can transmit a data unit (e.g., a transport block, or TB) to the serving base station 104, at operation 410.

The serving base station 104 can send a first acknowledgement status, which can be used to support a retransmission mechanism that can be implemented at a first logical layer, such as a MAC layer (e.g., MAC layer 314), of the wireless communication device 102, at operation 420. For example, operation 420 can include the serving base station 104 sending an acknowledgement status that can provide feedback for a HARQ process on the wireless communication device 102 via a PHICH.

At operation 430, the serving base station 104 can send a second acknowledgement status, which can be used to support a retransmission mechanism that can be implemented at a second logical layer, such as an RLC layer (e.g., RLC layer 316), of the wireless communication device 102. For example, operation 430 can include the serving base station 104 sending an acknowledgement status via a PDSCH.

The wireless communication device 102 can determine at the first logical layer (e.g., under control of the retransmission control module 218) whether to perform a retransmission of the data unit transmitted in operation 410 based at least in part on both the first logical layer acknowledgement status of operation 420 and the second logical layer acknowledgement status of operation 430. In this regard, the retransmission control module 218 can be configured to determine, at the first logical layer, the acknowledgement status for the data unit at the second logical layer and can use the acknowledgement status at the second logical layer to determine whether to perform retransmission of the data unit via the retransmission mechanism that can be implemented at the first logical layer. For example, in an instance in which the acknowledgement status for the second logical layer retransmission mechanism that can be transmitted in operation 430 is a NACK, the retransmission control module 218 can determine to perform a retransmission of the data unit via the first logical layer retransmission mechanism. If, however, the acknowledgement status for the second logical layer retransmission mechanism that can be transmitted in operation 430 is an ACK, the retransmission control module 218 can determine not to perform a retransmission of the data unit via the first logical layer retransmission mechanism. In an instance in which the retransmission control module 218 determines to perform retransmission of the data unit via the retransmission mechanism of the first logical layer, the data unit can be retransmitted to the serving base station 104, as illustrated by operation 440.

It will be appreciated that the timing diagram of FIG. 4 is provided by way of illustrative example, In this regard, it will be appreciated that the signaling diagram is a conceptual representation of the relation between data unit transmission, acknowledgement status feedback, and possible retransmission in accordance with some example embodiments. The relative timing between the respective operations is provided purely by way of example, such that the actual timing between two respective operations can differ from that illustrated in FIG. 4, and in some example embodiments, two or more operations can occur concurrently.

Figure 5:
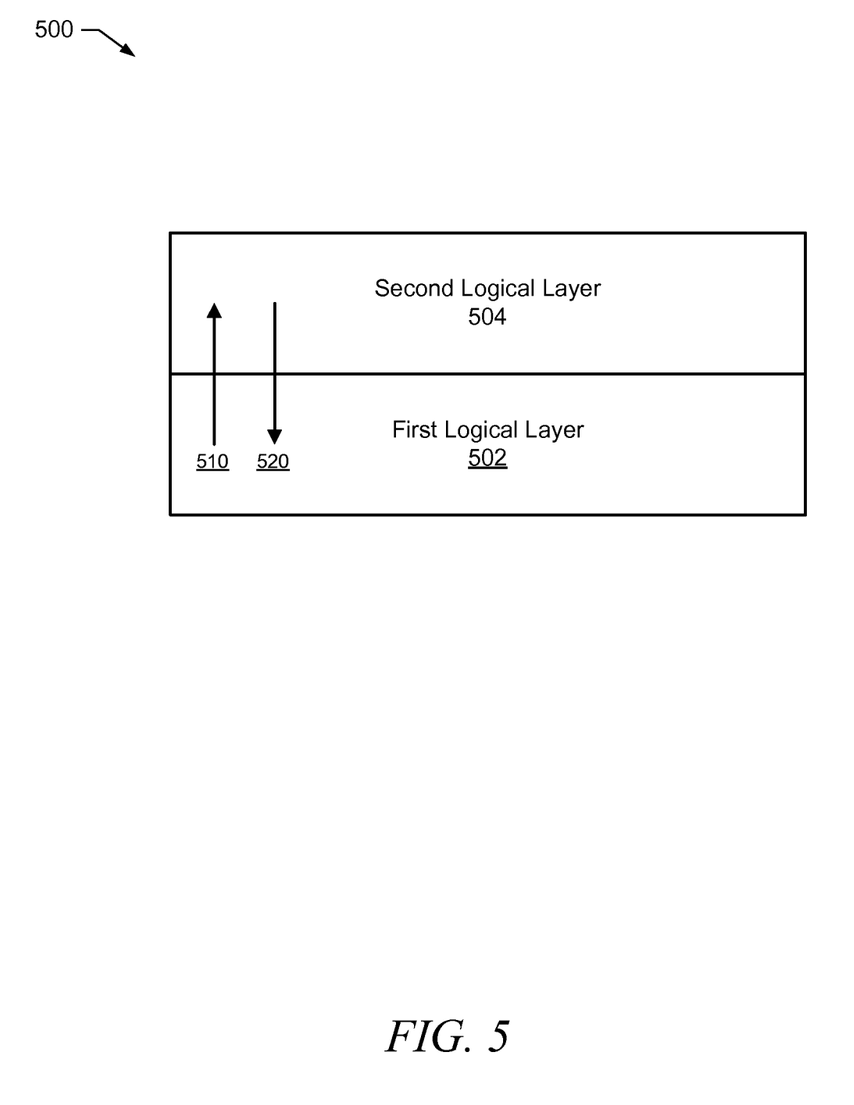
FIG. 5 illustrates inter-layer communication that can be implemented in accordance with some example embodiments.

FIG. 5 illustrates inter-layer communication that can be implemented in accordance with some example embodiments. In this regard, FIG. 5 illustrates a portion of a protocol stack 500 that can be implemented on the wireless communication device 102. The protocol stack 500 can include the first logical layer 502 and the second logical layer 504, which can be a higher layer on the protocol stack 500 than the first logical layer 502. The first logical layer 502 can, for example, comprise a MAC layer, such as MAC layer 314. The second logical layer 504 can, for example, comprise an RLC layer, such as RLC layer 316. It will be appreciated that the protocol stack 500 can include one or more additional layers which can be implemented above the second logical layer 504 and/or below the first logical layer 502 in the protocol stack. Further, in some example embodiments, the protocol stack 500 can comprise one or more intermediary layers that can be implemented in between the first logical layer 502 and the second logical layer 504.

The first logical layer 502 can control a first retransmission mechanism, such as HARQ. A first acknowledgement status for a transmitted data unit can be decoded at the first logical layer 502. The first acknowledgement status can be an acknowledgement status, such as HARQ feedback, that can be provided to the first logical layer 502 for use in the first retransmission mechanism. For example, the first acknowledgement status can be the acknowledgement status that can be transmitted to the wireless communication device 102 in operation 420 in the example of FIG. 4.

The second logical layer 504 can implement a second retransmission mechanism, such as ARQ. A second acknowledgement status for the transmitted data unit can be provided to the second logical layer 504 to support the second retransmission mechanism. For example, the second acknowledgement status can be the acknowledgement status that can be transmitted to the wireless communication device 102 in operation 430 in the example of FIG. 4.

The first logical layer 502 can be configured (e.g., under control of the retransmission control module 218) to request the second logical layer 504 to provide an indication of the acknowledgement status of the transmitted data unit at the second logical layer 504, as illustrated by operation 510. The request of operation 510 can, for example, be performed via polling and/or other cross-layer communication mechanism that can be used to request information. The second logical layer 504 can, in turn, provide the first logical layer 502 with a response (e.g., a polling response) to the request, as illustrated by operation 520. The response can include an indication of the acknowledgement status of the data unit at the second logical layer 504.

In some example embodiments, operation 510 can comprise the first logical layer 502 polling the second logical layer 504 for the acknowledgement status of the transmitted data unit at the second logical layer 504. The polling request can, for example, include a sequence identifier of the transmitted data unit, which can be used to uniquely refer to the data unit. The sequence identifier can comprise any identifier (e.g., a numeric identifier, alphabetic identifier, alphanumeric identifier, and/or other identifier) that can be given to a data unit to enable the wireless communication device 102 and serving base station 104 to identify the data unit and distinguish the data unit from other data units. In some embodiments, a sequence identifier for a data unit can be included in a header or other portion of the data unit such that the serving base station 104 can uniquely refer to the data unit when providing an acknowledgement status to the wireless communication device 102. The second logical layer 504 can accordingly identify the data unit based on the sequence identifier, and the polling response that can be provided to the first logical layer 502 in operation 520 can include the acknowledgement status (e.g., ACK or NACK) for the data unit.

In some embodiments in which the first logical layer 502 can poll the second logical layer 504 for the acknowledgement status of the transmitted data unit at the second logical layer 504, the first logical layer 502 can be configured to poll the second logical layer 504 for the acknowledgement status of the transmitted data unit in response to receiving the first acknowledgement status that can be provided to and decoded by the first logical layer 502 for use in the first retransmission mechanism. The polling of operation 510 in some such embodiments can be performed in parallel to decoding the first acknowledgement status at the first logical layer 502. Alternatively, the polling of operation 510 in some such embodiments can be performed after parallel to decoding the first acknowledgement status at the first logical layer 502.

In some example embodiments, the polling response of operation 520 can include a sequence identifier of a most recent transmitted data unit that has been acknowledged at the second logical layer 504. The first logical layer 502 can determine the acknowledgement status of the data unit that the first logical layer 502 is determining whether to retransmit by comparing the sequence identifier that can be included in the response to a sequence identifier associated with the data unit to determine whether there is a correspondence between the sequence identifiers.

For purposes of example, assume the first logical layer 502 is determining whether to retransmit data unit N. The first logical layer 502 can determine whether the sequence identifier of the most recent transmitted data unit that has been acknowledged at the second logical layer 504 corresponds to a sequence identifier for data unit N. If the sequence identifiers are the same, the first logical layer 502 can determine that there is a correspondence between the sequence identifiers such that data unit N has been acknowledged as properly received and does not need to be retransmitted. In some embodiments, such as some embodiments in which cumulative acknowledgements can be implemented by the second logical layer 504, the first logical layer 502 can also determine that data unit N has been acknowledged as properly received and does not need to be retransmitted if the sequence identifier of the most recent transmitted data unit that has been acknowledged at the second logical layer 504 is a sequence identifier for a data unit transmitted after data unit N. If, however, the sequence identifier of the most recent transmitted data unit that has been acknowledged at the second logical layer 504 is not the same as the sequence identifier of data unit N and/or is the sequence identifier of a data unit transmitted prior to data unit N, the first logical layer 502 can determine that the sequence numbers do not correspond such that data unit N has not been properly received, and should be retransmitted.

In some embodiments in which the response of operation 520 includes a sequence identifier of a most recent transmitted data unit acknowledged at the second logical layer 504, the first logical layer 502 can periodically poll the second logical layer 504 to request the second logical layer 504 to provide sequence identifier and/or other indication of the most recent transmitted data unit acknowledged at the second logical layer 504. By way of non-limiting example, in some embodiments in which such polling is performed periodically, the periodic interval between polling can be somewhere between 1 millisecond and 2 milliseconds. However, it will be appreciated that the periodic interval of the polling can vary in various embodiments. For example, in some embodiments, the periodic interval of polling can be selected based on a data transmission rate, network conditions, and/or various other factors that can affect the frequency of data transmission by the wireless communication device 102 and/or frequency of acknowledgement by the serving base station 104.

Figure 6:
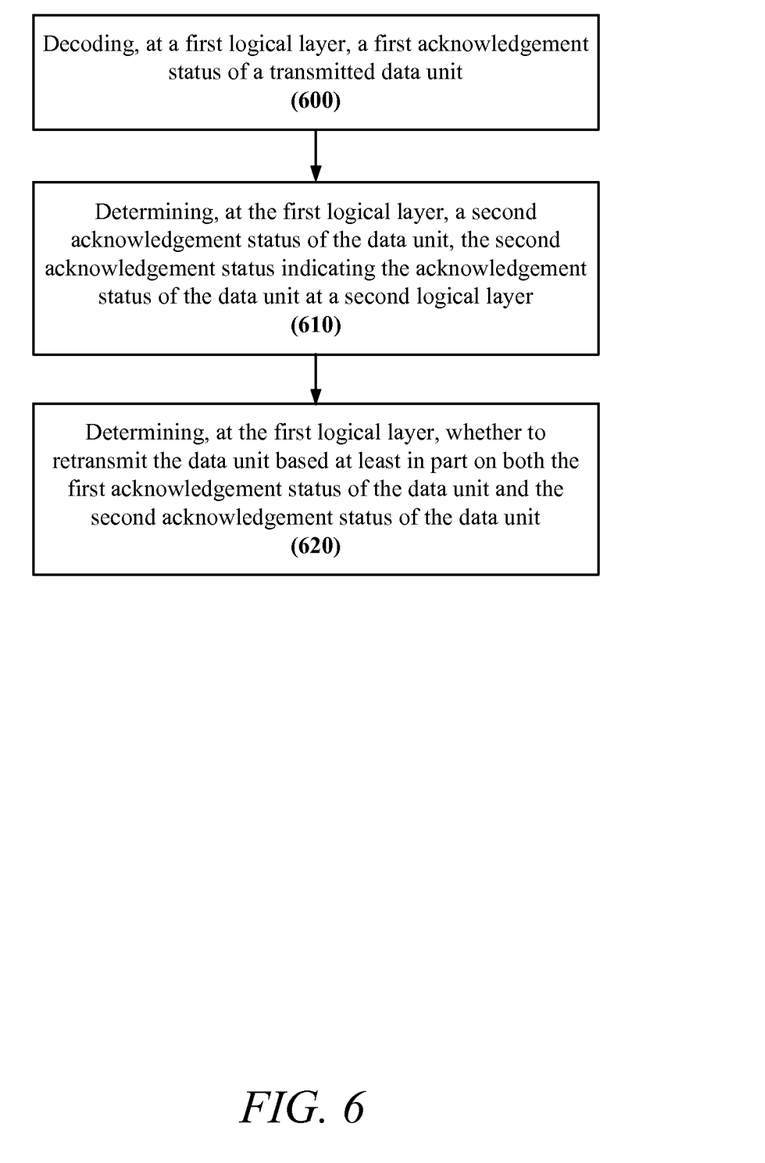
FIG. 6 illustrates a flowchart according to an example method for improving uplink transmission rate in a wireless communication device in accordance with some example embodiments.

FIG. 6 illustrates a flowchart according to an example method for improving uplink transmission rate in a wireless communication device, such as wireless communication device 102, in accordance with some example embodiments. One or more of processing circuitry 210, processor 212, memory 214, wireless communication interface 216, or retransmission control module 218 can, for example, provide means for performing one or more of the operations illustrated in and described with respect to FIG. 6.

Operation 600 can include the wireless communication device 102 decoding, at a first logical layer (e.g., the MAC layer), a first acknowledgement status of a transmitted data unit. The transmitted data unit can, for example, be the data unit that can be transmitted at operation 410 in the example of FIG. 4. The first logical layer can, for example, be the first logical layer 502 and/or the MAC layer 314. The first acknowledgement status can be an acknowledgement status that can be transmitted by the serving base station 104 to support a retransmission mechanism that can be controlled by the first logical layer. For example, the first acknowledgement status can be the acknowledgement status that can be transmitted in operation 420 in the example of FIG. 4. In some example embodiments, the first acknowledgement status can comprise HARQ feedback, such as can be received by the wireless communication device 102 on a PHICH.

Operation 610 can comprise the wireless communication device 102 determining, at the first logical layer, a second acknowledgement status of the data unit. The second acknowledgement status can be indicative of the acknowledgement status of the data unit at a second logical layer, such as an RLC layer, of the wireless communication device 102. The second logical layer can, for example, be the second logical layer 504 and/or the RLC layer 316. The second acknowledgement status of the data unit can be can acknowledgement status that can be transmitted by the serving base station 104 to support a retransmission mechanism, such as ARQ, that can be implemented at the second logical layer. For example, the second acknowledgement status can be the acknowledgement status that can be transmitted in operation 430 in the example of FIG. 4. In some example embodiments, the second acknowledgement status can be received by the wireless communication device 102 on a PDSCH. The determination of operation 610 can, for example, be performed via cross-layer communication between the first logical layer and the second logical layer, such as illustrated in and described with respect to the example of FIG. 5.

Operation 620 can include the wireless communication device 102 determining, at the first logical layer, whether to retransmit the data unit based at least in part on both the first acknowledgement status of the data unit and the second acknowledgement status of the data unit.

Figure 7:
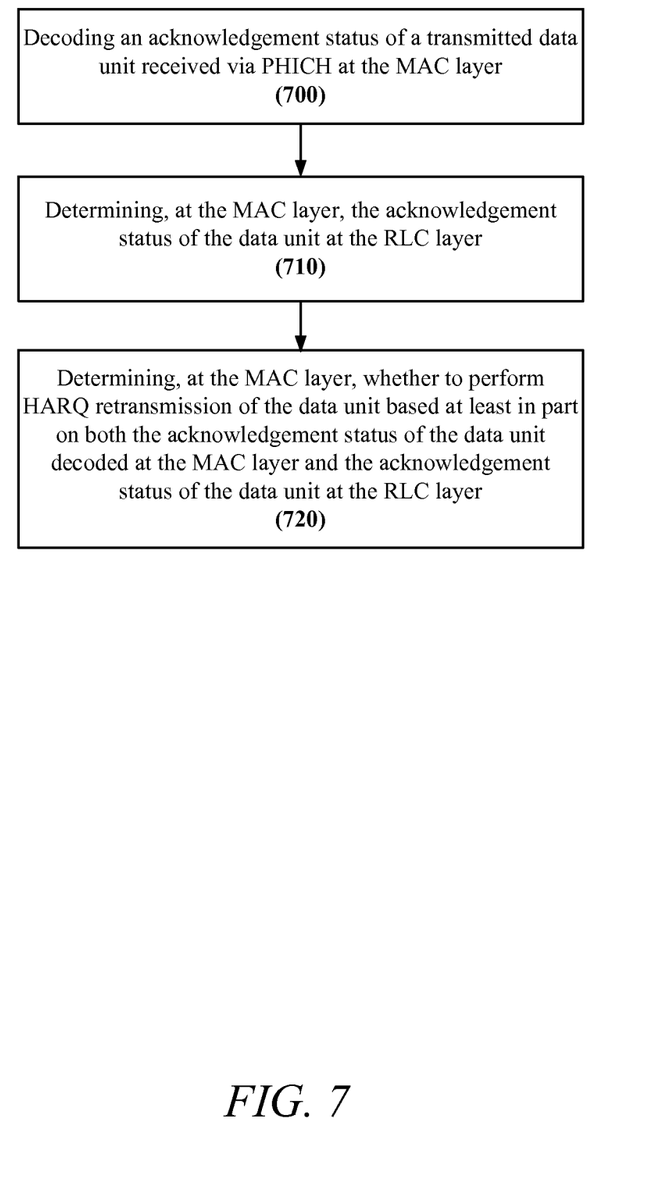
FIG. 7 illustrates a flowchart according to an example method for improving uplink transmission rate by factoring RLC layer acknowledgement status when making HARQ retransmission decisions at the MAC layer in accordance with some example embodiments.

FIG. 7 illustrates a flowchart according to an example method for improving uplink transmission rate by factoring RLC layer acknowledgement status when making HARQ retransmission decisions at the MAC layer in accordance with some example embodiments. In this regard, FIG. 7 illustrates an embodiment of the method of FIG. 6 in which a determination of whether to perform retransmission of a previously transmitted data unit can comprise determining whether to perform HARQ retransmission at a MAC layer based on an acknowledgement status of the data unit at the RLC layer. One or more of processing circuitry 210, processor 212, memory 214, wireless communication interface 216, or retransmission control module 218 can, for example, provide means for performing one or more of the operations illustrated in and described with respect to FIG. 7.

Operation 700 can include the wireless communication device 102 decoding an acknowledgement status of a transmitted data unit at the MAC layer. The acknowledgement status can be an acknowledgement status received by the wireless communication device via PHICH. In this regard, operation 700 can, for example, correspond to an embodiment of operation 600.

Operation 710 can comprise the wireless communication device 102 determining, at the MAC layer, the acknowledgement status of the data unit at the RLC layer. Operation 710 can, for example, correspond to an embodiment of operation 610.

Operation 720 can include the wireless communication device 102 determining, at the MAC layer, whether to perform HARQ retransmission of the data unit based at least in part on both the acknowledgement status of the data unit decoded at the MAC layer and the acknowledgement status of the data unit at the RLC layer. In this regard, operation 720 can, for example, correspond to an embodiment of operation 620.

In some example embodiments, if the acknowledgement status of a transmitted data unit decoded at the first logical layer is an ACK, the first logical layer (e.g., the MAC layer) can initiate transmission of a next data unit (if available) on the uplink prior to determining the acknowledgement status of the data unit at the second logical layer.

However, in some embodiments, the first logical layer can wait to initiate transmission of the next data unit at least until after the acknowledgement status of the previously transmitted data unit at the second logical layer has been determined. If the acknowledgement status of the previously transmitted data unit at the second logical layer is also an ACK, the first logical layer can determine that the previously transmitted data unit does not need to be retransmitted and can proceed with scheduling transmission of the next data unit. If, however, the acknowledgement status of the previously transmitted data unit at the second logical layer is a NACK, the first logical layer can initiate retransmission of the previously transmitted data unit and wait to transmit the next data unit until after retransmission of the previously transmitted data unit has been completed.

In some example embodiments, if the acknowledgement status of a transmitted data unit decoded at the first logical layer is a NACK, the retransmission control module 218 can be configured defer retransmission of the previously transmitted data unit until determining the acknowledgement status of the data unit at the second logical layer. If the acknowledgement status at the second logical layer is also a NACK, thereby confirming validity of the NACK decoded at the first logical layer, the retransmission control module 218 can be configured to initiate retransmission of the data unit. If, however, the acknowledgement status of the data unit at the second logical layer is an ACK, the retransmission control module 218 can be configured to rely on the acknowledgement status at the second logical layer, and can determine to not retransmit the data unit in spite of the NACK decoded at the first logical layer.

However, in some example embodiments, if the acknowledgement status of a transmitted data unit decoded at the first logical layer is a NACK, the retransmission control module 218 can be configured to initiate retransmission of the data unit in parallel with the first logical layer determining the acknowledgement status of the data unit at the second logical layer so as to provide a faster retransmission rate in the event that the acknowledgement status at the second logical layer is also a NACK. If, however, the acknowledgement status of the data unit at the second logical layer is determined to be an ACK, the retransmission control module 218 can terminate the retransmission and the wireless communication device 102 and can proceed with transmission of a next data unit that is ready for transmission (if one is available).

Figure 8:
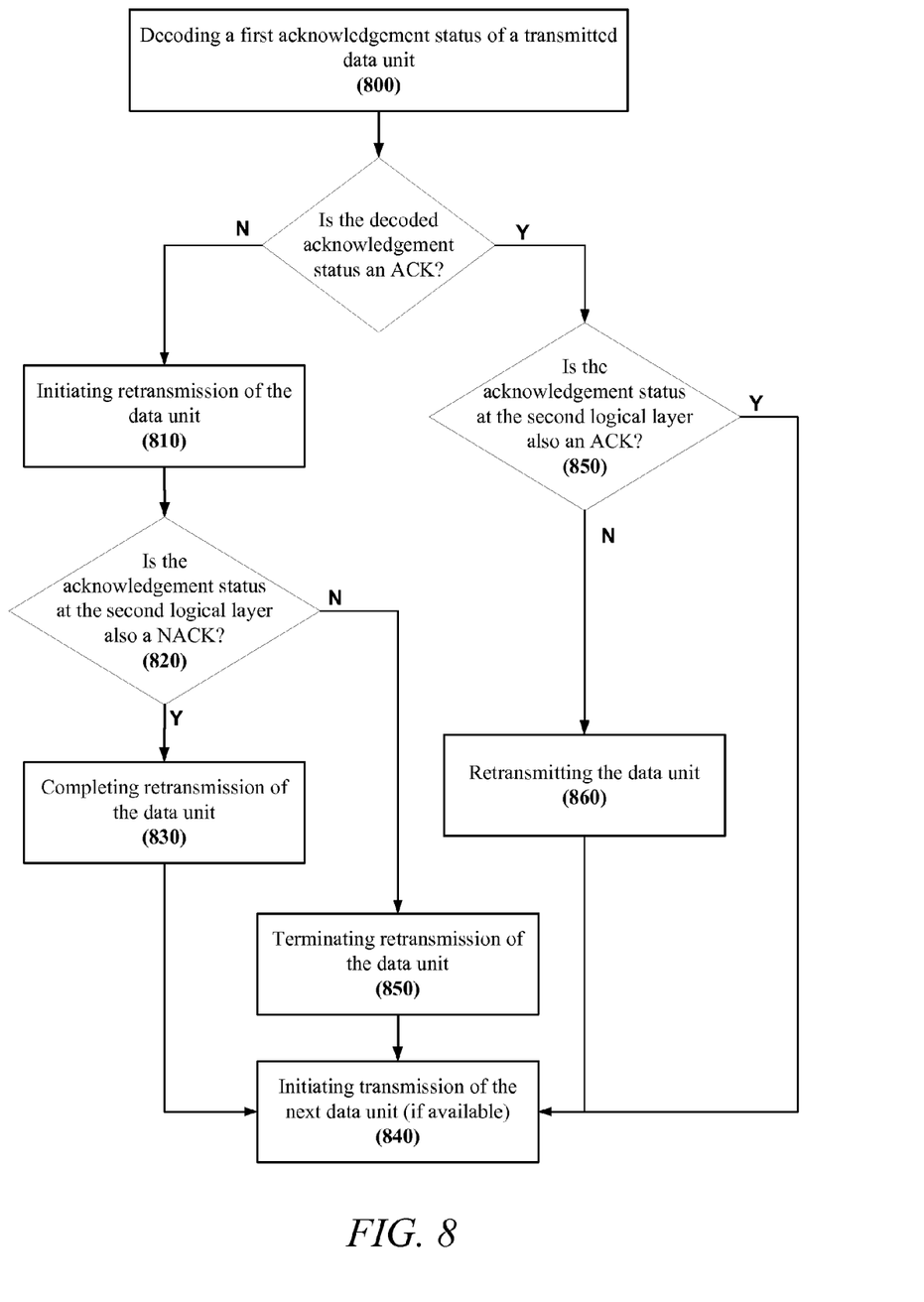
FIG. 8 illustrates a flowchart according to another example method for improving uplink transmission rate in a wireless communication device in accordance with some example embodiments.

FIG. 8 illustrates a flowchart according to an example method for improving uplink transmission rate in a wireless communication device, such as wireless communication device 102, in accordance with some example embodiments in which retransmission of a data unit can be initiated at the first logical layer in parallel with determining the acknowledgement status of the data unit at the second logical layer in an instance in which a NACK is decoded at the first logical layer. In this regard, FIG. 8 illustrates operations that can be performed at a first logical layer, such as a MAC layer, of the wireless communication device 102 in accordance with some example embodiments. For example, the method of FIG. 8 can be performed by the first logical layer 502 and/or MAC layer 314 in accordance with some example embodiments. One or more of processing circuitry 210, processor 212, memory 214, wireless communication interface 216, or retransmission control module 218 can, for example, provide means for performing one or more of the operations illustrated in and described with respect to FIG. 8.

Operation 800 can include the first logical layer decoding a first acknowledgement status of a transmitted data unit. Operation 800 can, for example, correspond to an embodiment of operation 600 and/or operation 700.

In an instance in which the acknowledgement status decoded in operation 800 is a NACK, the method can proceed to operation 810, which can include the first logical layer initiating retransmission of the data unit. For example, in some embodiments, operation 810 can include initiating a HARQ retransmission of the data unit.

In parallel with retransmission of the data unit, the first logical layer can determine whether the acknowledgement status of the data unit at the second logical layer is also a NACK, at operation 820. Operation 820 can, for example, correspond to an embodiment of operation 610 and/or operation 710.

In an instance in which it is determined at operation 820 that the acknowledgement status at the second logical layer is also a NACK, the method can proceed to operation 830, which can include the first logical layer (and any cooperating layers, such as the physical layer) completing retransmission of the data unit. The method can then proceed to operation 840, which can include the first logical layer initiating transmission of the next data unit (if available).

If, however, it is determined at operation 820 that the acknowledgement status at the second logical layer is an ACK, the method can instead proceed to operation 850, which can include the first logical layer terminating retransmission of the data unit. For example, if retransmission is handled via a HARQ process, the HARQ retransmission can be terminated. The method can then proceed to operation 840.

Returning to operation 800, if the acknowledgement status decoded at the first logical layer in operation 800 is an ACK rather than a NACK, the method can proceed to operation 850 rather than operation 810. Operation 850 can include the first logical layer determining whether the acknowledgement status of the data unit at the second logical layer is also an ACK. Operation 850 can, for example, correspond to an embodiment of operation 610 and/or operation 710.

In an instance in which it is determined at operation 850 that the acknowledgement status at the second logical layer is also an ACK, the method can proceed to operation 840, and the next data unit (if available) can be transmitted. If, however, it is determined at operation 850 that the acknowledgement status at the second logical layer is a NACK, the method can proceed to operation 860, which can include retransmitting the data unit.

In some example embodiments, if the acknowledgment status decoded at the first logical layer in operation 800 is an ACK, transmission of the next data unit (e.g., operation 840) can be initiated prior to and/or in parallel with operation 850.

It will be appreciated that embodiments described as being implemented at the MAC layer with consideration of an acknowledgement status at the RLC layer are provided by way of example, and not by way of limitation. In this regard, it will be appreciated that techniques described with respect to these embodiments can be applied mutatis mutandis to implementation within any logical layer in addition to or in lieu of the MAC layer, and can consider an acknowledgement status for any logical layer in addition to or in lieu of the RLC layer within the scope of the disclosure. Similarly, embodiments described with respect to HARQ are also provided by way of example and not by way of limitation, such that techniques described with respect to these embodiments can be applied mutatis mutandis to any retransmission mechanism within the scope of the disclosure.

The various aspects, embodiments, implementations or features of the described embodiments can be used separately or in any combination. Various aspects of the described embodiments can be implemented by software, hardware or a combination of hardware and software. The described embodiments can also be embodied as a computer readable medium (or mediums) storing computer readable code including instructions that can be performed by one or more computing devices. The computer readable medium may be associated with any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for improving uplink transmission in a wireless communication device comprising a first logical layer and a second logical layer, the method comprising:
   by the wireless communication device:
   transmitting a data unit on an uplink to a wireless network;
   decoding, at the first logical layer, a first acknowledgement status of the data unit received from the wireless network;
   determining, at the first logical layer, a second acknowledgement status of the data unit at the second logical layer; and
   determining, at the first logical layer, whether to retransmit the data unit based at least in part on both the first acknowledgement status of the data unit decoded at the first logical layer and the second acknowledgement status of the data unit determined at the second logical layer by at least:
      in an instance in which the first acknowledgement status of the data unit is an acknowledgement (ACK):
         retransmitting the data unit in an instance in which the second acknowledgement status of the data unit is a negative-acknowledgement (NACK); and
         not retransmitting the data unit in an instance in which the second acknowledgement status of the data unit is also an ACK; and
      in an instance in which the first acknowledgement status of the data unit is a NACK:

retransmitting the data unit in an instance in which the second acknowledgement status of the data unit is also a NACK; and not retransmitting the data unit in an instance in which the second acknowledgement status of the data unit is an ACK, wherein the second logical layer is a higher layer on a protocol stack than the first logical layer.

2. The method of claim 1, wherein the first logical layer is a media access control (MAC) layer and the second logical layer is a radio link control (RLC) layer.

3. The method of claim 1, wherein the method further comprises:

by the wireless communication device, in response to decoding the ACK at the first logical layer:

initiating transmission of a next data unit on the uplink prior to the first logical layer determining the acknowledgement status of the data unit at the second logical layer.

4. The method of claim 1, wherein the method further comprises: by the wireless communication device:

waiting to initiate transmission of a next data unit on the uplink at least until after determining whether to retransmit the data unit.

5. The method of claim 1, wherein the method further comprises:

by the wireless communication device, in the instance in which first acknowledgement status of the data unit decoded at the first logical layer is the NACK:

initiating retransmission of the data unit at the first logical layer prior to determining the acknowledgement status of the data unit at the second logical layer;

completing retransmission of the data unit in an instance in which the acknowledgement status of the data unit at the RLC second logical layer is also the NACK; and terminating retransmission of the data unit in an instance in which the acknowledgement status of the data unit at the second logical layer is the ACK.

6. The method of claim 1, wherein determining the acknowledgement status of the data unit at the RLC second logical layer comprises the RLC second logical layer:

determining a sequence identifier of a most recently transmitted data unit acknowledged at the second logical layer; and determining whether the sequence identifier of the most recently transmitted data unit acknowledged at the second logical layer corresponds to a sequence identifier of the data unit.

7. The method of claim 1, wherein determining the acknowledgement status of the data unit at the second logical layer comprises the first logical layer:

polling the second logical layer to determine the acknowledgement status of the data unit at the second logical layer; and receiving a polling response from the second logical layer, the polling response indicating the acknowledgement status of the data unit at the second logical layer.

8. The method of claim 7, wherein polling the second logical layer comprises periodically polling the second logical layer for an indication of a most recently transmitted data unit acknowledged at the second logical layer.

9. The method of claim 7, wherein polling the second logical layer comprises polling the second logical layer in response to receiving the acknowledgement status of the data unit decoded at the first logical layer.

10. The method of claim 7, wherein polling the second logical layer comprises one of:

polling the second logical layer for an acknowledgement status of a sequence identifier of the data unit; or polling the second logical layer for a sequence identifier of a most recently transmitted data unit acknowledged at the second logical layer.

11. The method of claim 1, wherein the wireless communication device retransmits the data unit by performing a hybrid automatic repeat request (HARQ) retransmission of the data unit.

12. The method of claim 1, wherein:

the wireless network comprises a Long Term Evolution (LTE) wireless network; and the first acknowledgement status is received on a physical hybrid automatic repeat request indicator channel (PHICH); and the second acknowledgement status is received on a physical downlink shared channel (PDSCH).

13. A wireless communication device comprising:

a wireless communication interface configured to send signals to and receive signals from a wireless network; and processing circuitry coupled with the wireless communication interface, wherein the processing circuitry is configured to cause the wireless communication device to at least:

implement a first logical layer and a second logical layer, wherein the second logical layer is a higher layer on a protocol stack than the first logical layer;

transmit a data unit on an uplink;

decode, at the first logical layer, a first acknowledgement status of the data unit;

determine, at the first logical layer, a second acknowledgement status of the data unit, wherein the second acknowledgement status of the data unit is an acknowledgement status of the data unit at the second logical layer; and determine, at the first logical layer, whether to retransmit the data unit based at least in part on both the first acknowledgement status of the data unit and the second acknowledgement status of the data unit by at least causing the wireless communication device to:

in an instance in which the first acknowledgement status of the data unit is an acknowledgement (ACK):

retransmit the data unit in an instance in which the second acknowledgement status of the data unit is a negative-acknowledgement (NACK); and not to retransmit the data unit in an instance in which the second acknowledgement status of the data unit is also an ACK; and in an instance in which the first acknowledgement status of the data unit is a NACK:

retransmit the data unit in an instance in which the second acknowledgement status of the data unit is also a NACK; and not to retransmit the data unit in an instance in which the second acknowledgement status of the data unit is an ACK.

14. The wireless communication device of claim 13, wherein the first logical layer is a media access control (MAC) layer, and wherein the second logical layer is a radio link control (RLC) layer.

15. The wireless communication device of claim 13, wherein:

the first acknowledgement status of the data unit is received by the wireless communication device on a physical hybrid automatic repeat request indicator channel (PHICH); and the second acknowledgement status of the data unit is received by the wireless communication device on a physical downlink shared channel (PDSCH).

16. The wireless communication device of claim 13, wherein the processing circuitry is further configured to cause the wireless communication device to determine whether to retransmit the data unit at least in part by causing the wireless communication device to determine whether to perform hybrid automatic repeat request (HARQ) retransmission of the data unit.

17. The wireless communication device of claim 13, wherein the processing circuitry is further configured to cause the wireless communication device to determine, at the first logical layer, the second acknowledgement status of the data unit at least in part by causing the wireless communication device to cause the first logical layer to:

poll the second logical layer to determine the second acknowledgement status of the data unit; and receive a polling response from the second logical layer, the polling response indicating the second acknowledgement status of the data unit.

18. A non-transitory computer readable storage medium having computer program code stored thereon, the computer program code comprising program code, which, when executed by one or more processors implemented on a wireless communication device configured to implement a first logical layer and a second logical layer, causes the wireless communication device to perform a method comprising:

decoding, at the first logical layer, a first acknowledgement status of a data unit transmitted on an uplink to the wireless network;

determining, at the first logical layer, a second acknowledgement status of the data unit, wherein the acknowledgement status of the data unit is an acknowledgement status of the data unit at the second logical layer; and determining, at the first logical layer, whether to retransmit the data unit based at least in part on the first acknowledgement status and the second acknowledgement status by at least causing the wireless communication device to:

in an instance in which the first acknowledgement status of the data unit is an acknowledgement (ACK):

retransmit the data unit in an instance in which the second acknowledgement status of the data unit is a negative-acknowledgement (NACK); and not to retransmit the data unit in an instance in which the second acknowledgement status of the data unit is also an ACK; and in an instance in which the first acknowledgement status of the data unit is a NACK:

retransmit the data unit in an instance in which the second acknowledgement status of the data unit is also a NACK; and not to retransmit the data unit in an instance in which the second acknowledgement status of the data unit is an ACK, wherein the second logical layer is a higher layer on a protocol stack than the first logical layer.

19. The non-transitory computer readable storage medium of claim 18, wherein the first logical layer is a media access control (MAC) layer, and wherein the second logical layer is a radio link control (RLC) layer.

20. The non-transitory computer readable storage medium of claim 19, wherein:

the acknowledgement status of the data unit is received by the wireless communication device on a physical downlink shared channel (PDSCH); and determining whether to retransmit the data unit comprises determining whether to perform a hybrid automatic repeat request (HARQ) retransmission of the data unit.

* * * * *

UNITED STATES PATENT AND TRADEMARK OFFICE
CERTIFICATE OF CORRECTION

PATENT NO. : 9,491,269 B2
APPLICATION NO. : 14/251445
DATED : November 8, 2016
INVENTOR(S) : Karri et al.

It is certified that error appears in the above-identified patent and that said Letters Patent is hereby corrected as shown below:

In the Claims

In Claim 5, Column 19, Line 37:
Delete the term "RLC" after "the"

In Claim 6, Column 19, Lines 42-43:
Delete the term "RLC"

Signed and Sealed this
Second Day of January, 2018

Joseph Matal
*Performing the Functions and Duties of the
Under Secretary of Commerce for Intellectual Property and
Director of the United States Patent and Trademark Office*